(12) United States Patent
Takubo et al.

(10) Patent No.: US 9,703,495 B2
(45) Date of Patent: Jul. 11, 2017

(54) MEMORY CONTROLLER, MEMORY SYSTEM, AND MEMORY CONTROL METHOD

(71) Applicant: TDK Corporation, Tokyo (JP)

(72) Inventors: Kenichi Takubo, Tokyo (JP); Kazuaki Kishi, Tokyo (JP)

(73) Assignee: TDK Corporation, Tokyo (JP)

( * ) Notice: Subject to any disclaimer, the term of this patent is extended or adjusted under 35 U.S.C. 154(b) by 81 days.

(21) Appl. No.: 14/620,332

(22) Filed: Feb. 12, 2015

(65) Prior Publication Data

US 2015/0277787 A1 Oct. 1, 2015

(30) Foreign Application Priority Data

Mar. 27, 2014 (JP) ................................ 2014-066369

(51) Int. Cl.
*G06F 3/06* (2006.01)
*G06F 12/02* (2006.01)

(52) U.S. Cl.
CPC ............ *G06F 3/0616* (2013.01); *G06F 3/065* (2013.01); *G06F 3/0659* (2013.01); *G06F 3/0679* (2013.01); *G06F 12/0246* (2013.01); *G06F 2206/1014* (2013.01); *G06F 2212/7211* (2013.01)

(58) Field of Classification Search
CPC ...... G06F 3/0616; G06F 3/0679; G06F 3/065; G06F 3/0659; G06F 2206/1014; G06F 12/00; G06F 12/0246; G06F 2212/7211
See application file for complete search history.

(56) References Cited

U.S. PATENT DOCUMENTS

| | | | | |
|---|---|---|---|---|
| 8,745,319 | B2* | 6/2014 | Langlois | G06F 12/0246 365/158 |
| 2003/0227804 | A1* | 12/2003 | Lofgren | G06F 12/0246 365/200 |
| 2008/0082736 | A1* | 4/2008 | Chow | G06F 12/0246 711/103 |
| 2008/0313505 | A1* | 12/2008 | Lee | G06F 12/0246 714/47.2 |
| 2009/0198869 | A1* | 8/2009 | Mosek | G06F 12/0246 711/103 |
| 2010/0017556 | A1* | 1/2010 | Chin | G06F 12/0246 711/103 |
| 2011/0138109 | A1* | 6/2011 | Liu | G06F 12/0246 711/103 |
| 2011/0258369 | A1* | 10/2011 | Hsiao | G11C 16/349 711/103 |

(Continued)

FOREIGN PATENT DOCUMENTS

JP 2005-275722 A 10/2005

*Primary Examiner* — Hiep Nguyen
(74) *Attorney, Agent, or Firm* — Posz Law Group, PLC (57) ABSTRACT

The memory controller comprises a storage unit in which the Registered-System-Max-NOE is registered per logical area and a processor which registers, in the storage unit, the System-Max-NOE (the maximum value of multiple erasures respectively corresponded to multiple physical areas) at the time when allocating a spare physical area in one of the logical areas as the Registered-System-Max-NOE to be associated with the allocation destination logical area. The processor performs a wear leveling processing based on the Registered-System-Max-NOE per logical area.

7 Claims, 5 Drawing Sheets

(56) References Cited

U.S. PATENT DOCUMENTS

| | | | |
|---|---|---|---|
| 2012/0144102 A1* | 6/2012 | Langlois | G06F 12/0246 |
| | | | 711/103 |
| 2012/0246394 A1* | 9/2012 | Ou | G06F 12/0246 |
| | | | 711/103 |
| 2015/0106556 A1* | 4/2015 | Yu | G11C 16/349 |
| | | | 711/103 |
| 2015/0261671 A1* | 9/2015 | Chu | G06F 12/0246 |
| | | | 711/103 |

* cited by examiner

MEMORY CONTROLLER, MEMORY SYSTEM, AND MEMORY CONTROL METHOD

CROSS-REFERENCE TO PRIOR APPLICATION

This application relates to and claims the benefit of priority from Japanese Patent Application number 2014-066369, filed on Mar. 27, 2014 the entire disclosure of which is incorporated herein by reference.

BACKGROUND

The present invention generally relates to memory control and especially relates to leveling of the NOEs (the numbers of times of erasure) of multiple physical areas in a memory. NAND flash memory includes multiple physical blocks, and each physical block includes multiple physical pages, and data is outputted and inputted per page (physical page), and data is erased per block (physical block). Generally a memory controller of NAND flash memory is configured to perform leveling of the NOEs (the numbers of times of erasure) of multiple physical blocks, namely, perform wear leveling processing.

For example, the wear leveling processing disclosed in Literature 1 (JP2005-275722) is as follows. That is, the NOE is managed as for each of multiple physical blocks in a flash memory. When the difference between the Max-NOE (the maximum NOE) and the Min-NOE (the minimum NOE) exceeds a threshold value, the data stored in the physical block with the Min-NOE is copied to a spare block (a copy destination block), and the copy source block (the physical block with Min-NOE) allocated to the logical address is replaced with the copy destination block, and the copy source block is managed as a spare block.

SUMMARY

According to the Literature 1, a wear leveling processing may occur frequently. It is because that, after the wear leveling processing, if a spare block whose the NOE is minimum in multiple spare blocks is allocated to a logical address and the NOE of the physical block with the Max-NOE is updated, the difference between the Max-NOE and the Min-NOE exceeds a threshold value again. If a wear leveling processing occurs frequently, a product life falls since NOEs of physical blocks increase vainly (that is, erasure is performed a lot). Further, if a wear leveling processing occurs frequently, the performance (the read/write speed) of the flash memory controller falls since the processing takes time.

Such a problem may exist not only in NAND flash memory but also in the memory of other kinds which need to erase data from a physical area in order to update the data stored in the physical area.

Therefore, the purpose of the present invention is to equalize NOEs, without frequent wear leveling processing.

In order to solve the above-mentioned problem, a memory controller according to the present invention comprises a storage unit in which Registered-System-Max-NOE (the registered number of times of erasure) is registered per logical area, and a processor being configured to register the System-Max-NOE (the maximum value of multiple NOEs which respectively corresponds to multiple physical areas) at the time when a spare physical area is allocated to one of the logical areas, in the storage unit as the Registered-System-Max-NOE to be associated with the allocation destination logical area.

A wear leveling processing is performed based on Registered-System-Max-NOEs of logical areas. As a result, it is possible to equalize NOEs without frequent wear leveling processing.

DETAILED DESCRIPTION OF THE EMBODIMENT

A flash memory system (hereinafter, FM system) with which the memory system according to an embodiment is applied hereafter is described.

In addition, the present invention is not limited to the following embodiment. For example, the present invention can include at least one of elements which are designed based on elements of the embodiment by a skilled person and elements which are substantially the same as elements of the embodiment.

Figure 1:
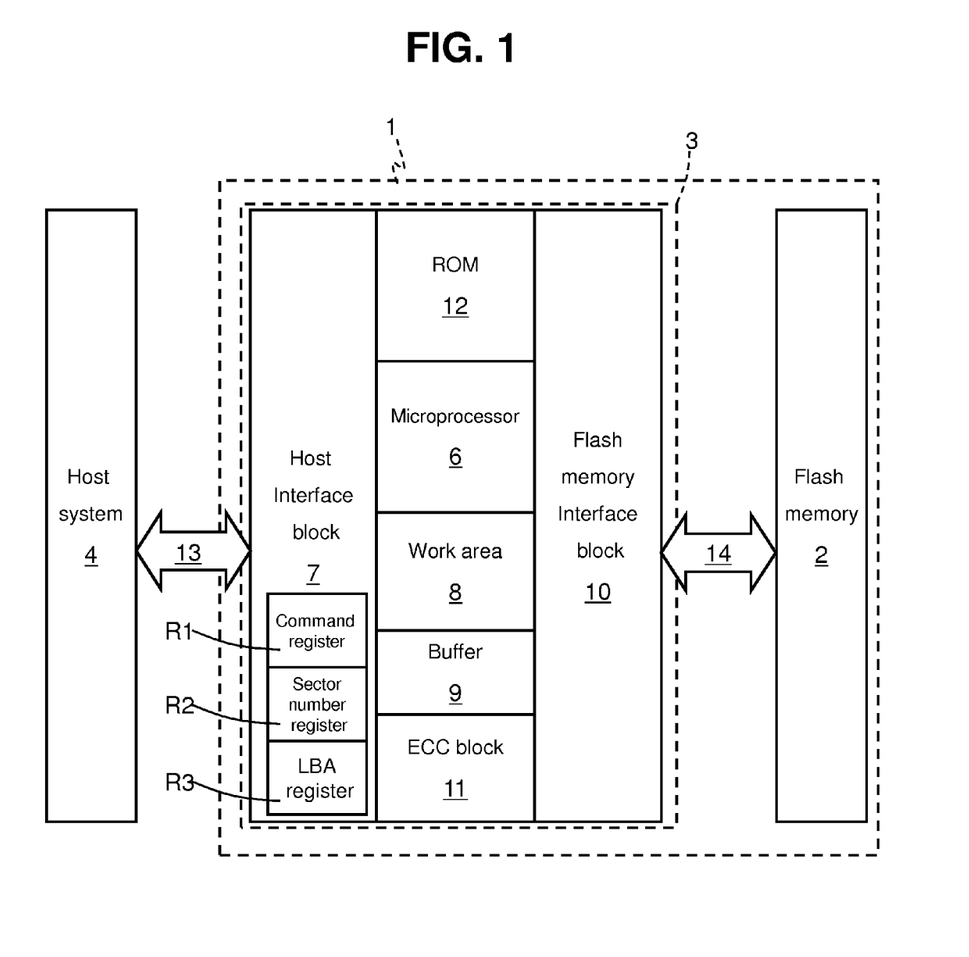
FIG. 1 shows a configuration of the flash memory system according to the embodiment of the present invention.

FIG. 1 shows a configuration of the FM system according to the embodiment.

The FM system 1 includes a flash memory 2 and a memory controller 3 which controls the flash memory 2.

The FM system 1 is coupled to a host system 4 through an external bus 13. The host system 4 includes a CPU (Central Processing Unit) for controlling operation of the whole host system 4, a companion chip for sending/receiving information to/from the FM system 1, and so on. The host system 4 may be various information processing units including, for example, a personal computer or a digital still camera which processes various kinds of information, such as characters, sounds, or image information.

The memory controller 3 includes a microprocessor 6, a host interface block 7, a work area 8, a buffer 9, a flash memory interface block 10, an ECC (Error Correcting Code) block 11, and a ROM (Read Only Memory) 12. The memory controller 3 is coupled to the flash memory 2 through the internal bus 14. The memory controller 3 including these functional blocks is accumulated on one semiconductor chip. Hereinafter, each functional block is described.

The host interface block 7 sends/receives data, address information, status information, external commands, etc. to/from the host systems 4. An external command is a command for the host system 4 to direct execution of processing to the FM system 1. The data, etc. sent to the FM system 1 from the host system 4 is taken into the inside of the FM system 1 (for example, buffer 9) through the host interface block 7.

Moreover, the data, etc. sent to the host system 4 from the FM system 1 is sent to the host system 4 through the host interface block 7. The host interface block 7 includes a command register R1, a sector number register R2, and an LBA register R3. The information given by the host system 4 is written in the command register R1, the sector number register R2, and the LBA register R3. External commands, such as write commands and read commands, are written in the command register R1. The number of sectors of access target area is written in the sector number register R2. The head LBA (Logical Block Address) of access target area is written in the LBA register R3.

The work area 8 which is an example of the storage unit is a work area which stores temporarily data required for a control of the flash memory 2, for example, and includes multiple SRAM (Static Random Access Memory) cells. In the work area 8, the address conversion table denoting the correspondence relationship between logical blocks and physical blocks are stored, for example. It is possible to convert a logical address to a physical address using an address conversion table. (It is possible to identify the physical block allocated to the access destination logical block.)

The buffer 9 holds data read from the flash memory 2 until the host system 4 is in the state in which a receipt is possible. Moreover, in the flash memory 2, the buffer 9 holds write data until the flash memory 2 is in the state which can write.

The flash memory interface block 10 sends/receives data, address information, status information, internal commands, etc. to/from the flash memory 2 through the internal bus 14. Here, an internal command is a command for the memory controller 3 to direct execution of processing to the flash memory 2, and the flash memory 2 operates according to the internal command given by the memory controller 3.

While generating an error correcting code (ECC: Error Correcting Code) added to the write data in the flash memory 2, the ECC block 11, detects and corrects the error included in the read data based on the error correcting code added to the read data.

ROM 12 is a nonvolatile storage cell which stores a program which defines the procedure of processing by the microprocessor 6. For example, ROM 12 stores a program which defines processing procedures, such as a creation of an address conversion table.

The microprocessor 6 controls a whole operation of the memory controller 3 according to the program stored in the ROM 12. For example, the microprocessor 6 makes the flash memory interface block 10 perform a processing based on the command set which defines the various processing read from the ROM 12.

The flash memory 2 includes a NAND type flash memory. The NAND type flash memory includes a register and a memory cell array by which multiple memory cells are arranged in two dimensions. The memory cell array includes multiple memory cell groups and a word line. Here, the memory cell group includes multiple memory cells which are connected in series. Each word line is for choosing the specific memory cell of the memory cell group. Either a write of data to the memory cell chosen from the register or a read of data to the register from the chosen memory cell between the memory cell and the register selected through this word line is performed. In the NAND type flash memory, a data read operation and a data write operation are performed per page (physical page), and a data erasure operation is performed per block (physical block). A physical block includes multiple physical pages.

In the write processing of the present embodiment, a command code denoting a write command is written in the command register R1, the number of sectors of write data is written in the sector number register R2, and LBA corresponding to the head data which starts writing is written in the LBA register R3 by the host system 4. Based on the information written in the sector number register R2 and the LBA register R3, a logical access area (an access target area) is distinguished, and the data given by the host system 4 is written in the physical block corresponding to the logical block in which the logical access area is included. The address space provided to the host system 4 is managed by LBAs which are serial numbers being allocated to areas (hereinafter called "logical sector areas") divided per sector (512 bytes) from the address space. Moreover, a logical block including multiple logical sector areas is formed, and one or multiple physical blocks are allocated to the logical block. The correspondence relationship between logical blocks and physical blocks is denoted by the address conversion table.

The address conversion table is stored in the work area 8, for example.

Figure 2:
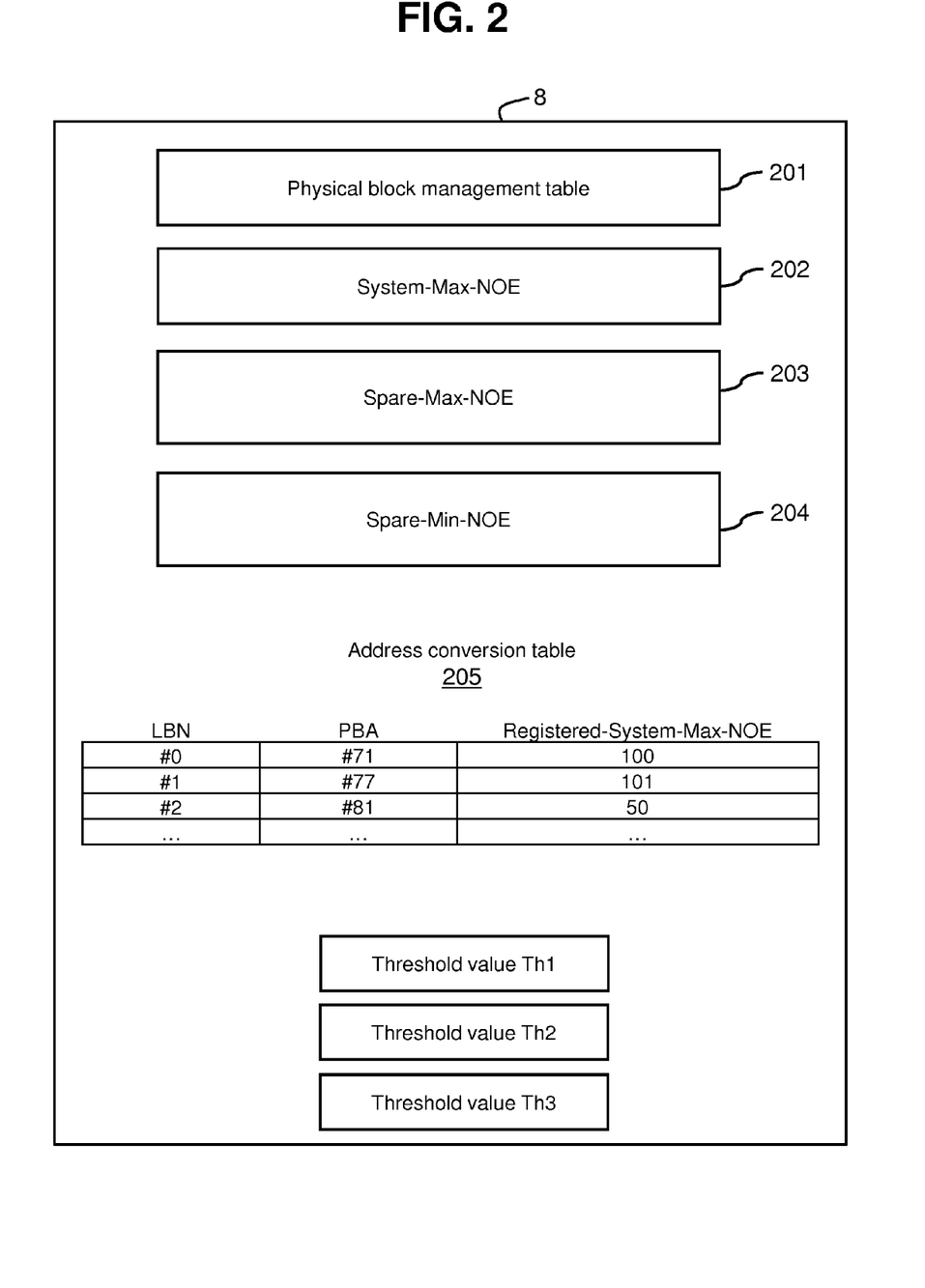
FIG. 2 shows an example of information stored in the work area according to the embodiment of the present invention.

FIG. 2 shows an example of information stored in the work area 8.

In the work area 8, physical block management table 201, System-Max-NOE 202, Spare-Max-NOE 203, Spare-Min-NOE 204, the address conversion table 205, threshold value Th1, threshold value Th2, and threshold value Th3 are stored, for example.

The physical block management table 201 includes information about each physical block, for example, and includes information denoting the block kind and the NOE (the number of times of erasure) per physical block. As a physical block (a block kind), there are a block in use (a physical block being allocated to a logical address), a spare block (a physical block being allocatable and in free), and a defective block (a physical block being not allocatable).

The System-Max-NOE 202 is an example of the information identified by the physical block management table 201, and is a value denoting the System-Max-NOE. "The System-Max-NOE" is the maximum number of times of erasure about the flash memory 2 of the FM system 1.

The Spare-Max-NOE 203 is an example of the information identified by the physical block management table 201, and is a value denoting the Spare-Max-NOE. "The Spare-Max-NOE" is the maximum number of times of erasure of one or more NOEs respectively corresponded to one or more spare blocks.

The Spare-Min-NOE 204 is an example of the information identified by the physical block management table 201, and is a value denoting the Spare-Min-NOE. "The Spare-Min-NOE" is the minimum number of times of erasure of one or more NOEs respectively corresponded to one or more spare blocks.

The address conversion table 205 includes the PBA (physical block address (for example, number)) of the physical block being allocated and the Registered-System-Max-NOE per LBN (logical block number). A logical block is an example of a logical area. A physical block is an example of a physical area. In the present embodiment, "the Registered-System-Max-NOE" is the NOE (the number of times of erasure) registered in the address conversion table 205, and is the System-Max-NOE at the time when a physical block is allocated. That is, the Registered-System-Max-NOE per LBN is not the NOE of the physical block being allocated to the LBN but is the System-Max-NOE at the time when the physical block is allocated to the LBN. The microprocessor 6 registers the System-Max-NOE at the time when allocating a physical block to a logical block, in the address conversion table 205, as the Registered-System-Max-NOE, together with the PBA of the physical block.

Each of the threshold value Th1, the threshold value Th2, and the threshold value Th3 is a threshold value compared, in the wear leveling processing (the below-mentioned 1st and 2nd wear leveling processing).

At least one of the threshold value Th1, the threshold value Th2, and the threshold value Th3 may either be a value which can be changed or the fixed value which cannot be changed by a user.

Each of the NOEs 202 to 204 is updated as necessary by the microprocessor 6 every time when the physical block management table 201 is updated by the microprocessor 6 (every time when the NOE of one of the physical blocks is updated, or every time when a spare block is allocated to a logical block). Moreover, each of the NOEs 202 to 204 does not have to reside in the work area 8 permanently. Also at least a part of the information shown in FIG. 2 may be stored in the memory area other than the work area 8 about the memory controller 3. Moreover, at least a part of the information shown in FIG. 2 (for example, the address conversion table 205) may be saved in the flash memory 2.

Hereinafter, the wear leveling processing according to the present embodiment is described.

Figure 3:
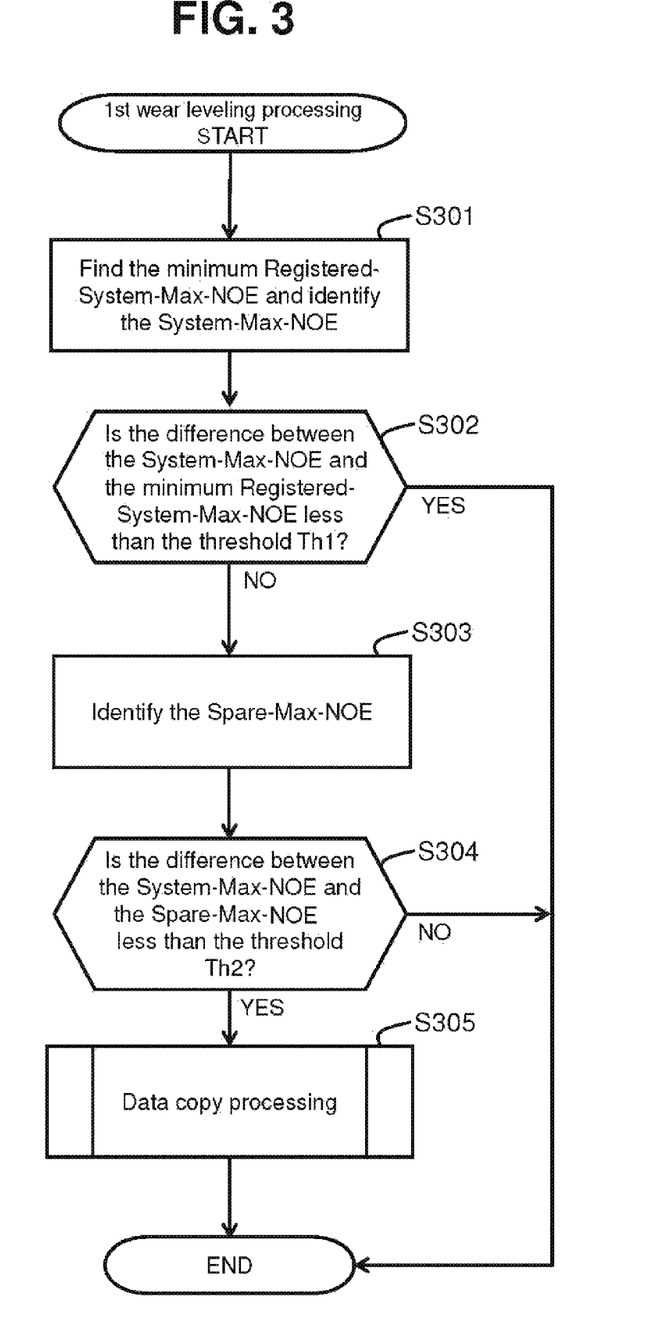
FIG. 3 is a flow chart of the 1st wear leveling processing according to the embodiment of the present invention.

FIG. 3 is a flow chart of the 1st wear leveling processing according to the present embodiment is described.

The 1st wear leveling processing is an example of a static wear leveling processing, and is started repeatedly (for example, periodically or every time when the situation of the FM system 1 fulfills predetermined conditions).

The microprocessor 6 searches the minimum Registered-System-Max-NOE from the address conversion table 205, and identifies the System-Max-NOE 202 (S301).

The microprocessor 6 judges whether the difference (the 1st difference) between the identified System-Max-NOE 202 and the minimum Registered-System-Max-NOE obtained by the search is less than the threshold value Th1 (S302).

When the judgment result of S302 is negative (that is, when the 1st difference is equal to or larger than the threshold value Th1) (S302: NO), the microprocessor 6 identifies the Spare-Max-NOE 203 (S303), and judges whether the difference (the 2nd difference) between the System-Max-NOE 202 and the Spare-Max-NOE 203 is less than the threshold value Th2 (S304).

Figure 4:
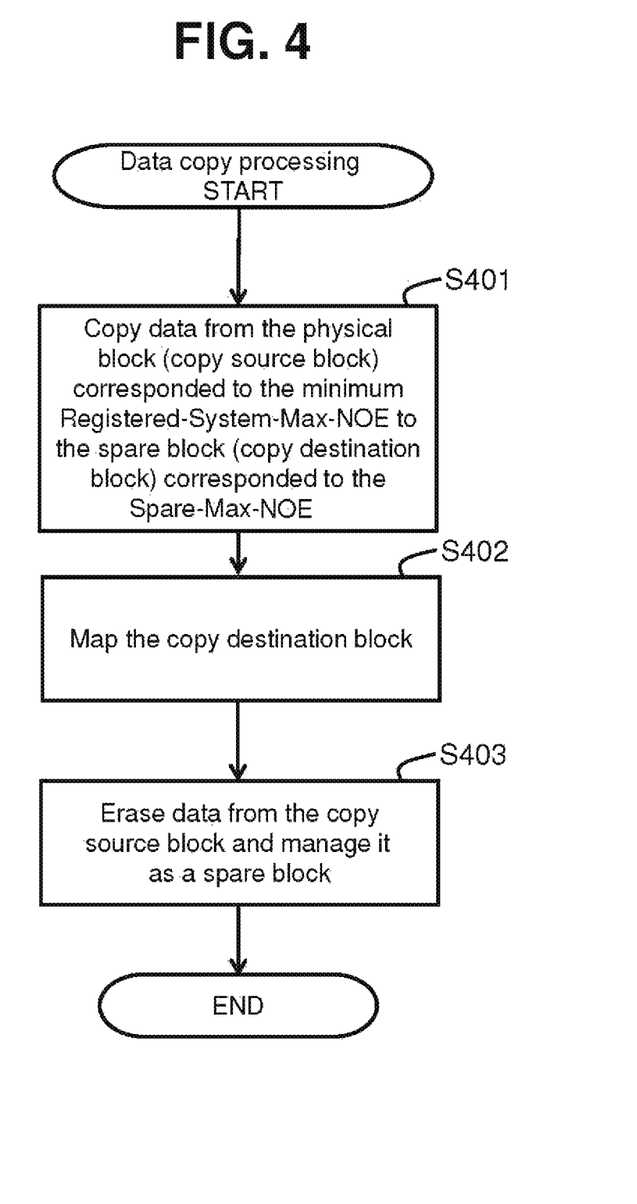
FIG. 4 is a flow chart of the data copy processing according to the embodiment of the present invention.

When the judgment result of S304 is affirmative (S304: YES), the microprocessor 6 performs a data copy processing (S305). Specifically, the following processing is performed. That is, as shown in FIG. 4, the microprocessor 6 copies data to a spare block (copy destination block) corresponded to the Spare-Max-NOE 203 from the physical block (copy source block) corresponded to the minimum Registered-System-Max-NOE (S401). The microprocessor 6 replaces the copy source block with the copy destination block by allocating the copy destination block, instead of the copy source block, to the allocation destination logical block of the copy source block (S402).

The microprocessor 6 erases data from the copy source block, updates the NOE (the number of times of erasure) of the copy source block (for example, adding 1 to the NOE of the copy source block), and manages the copy source block as a spare block (S403). The address conversion table 205 is updated by S402. Moreover, the physical block management table 201 is updated by S403, and in connection with it, at least the Spare-Max-NOE 203 of the Spare-Max-NOE 203 and the Spare-Min-NOE 204 are updated.

When the judgment result of S302 is affirmative (S302: YES), or when the judgment result of S304 is negative (that is, when the 2nd difference is equal to or larger than the threshold value Th2) (S304: NO), the microprocessor 6 ends the 1st wear leveling processing, without performing data copy processing (S305).

According to the 1st wear leveling processing, the meaning of which the "threshold value Th1" is set, is for judging the physical block which neither erasure nor write is performed for the time being, and the "threshold value Th2" is for judging whether there is any spare block erased by now. At least one of the "threshold value Th1" and the "the threshold value Th2" can be suitably decided according to the durability of the flash memory 2, etc.

Hereinafter, the meaning of the threshold value Th1 and the threshold value Th2 and the meaning of the judgment of S302 and S304 are described.

First, according to the fundamental view of wear leveling, the NOE of the physical block which is allocated to the updating logical block of high frequency (logical block with comparatively high updating frequency) becomes large easily, and the NOE of the physical block allocated to the updating logical block of low frequency (logical block with comparatively low updating frequency) is small, therefore it is desirable in the viewpoint of leveling of NOEs that the physical block with the small NOE is allocated to the updating logical block of high frequency, and the physical block with the large NOE is allocated to the updating logical block of low frequency.

According to the present embodiment, when a physical block is newly allocated to a logical block, the System-Max-NOE (Registered-System-Max-NOE) at the time when allocating the physical block, is associated with the logical block. The Registered-System-Max-NOE of each logical block is updated to the System-Max-NOE at the time, when the physical block being allocated to the logical block is replaced with another physical block.

The meaning of the threshold values Th1 and S302 is described. The logical block corresponded to the minimum Registered-System-Max-NOE is a logical block which updating is not made forever. With the present embodiment, it is considered that the NOE of the physical block being allocated to such a logical block is the minimum. In judgment of S302, the actual NOE of the physical block being allocated to the logical block corresponded to the minimum Registered-System-Max-NOE is not taken into consideration. If the difference between the System-Max-NOE and the minimum Registered-System-Max-NOE is large, a logical block which updating is not made forever exists, therefore it is considered that the NOE has shown variation, and the processing progresses in the direction in which the data copy processing (S305) is performed. Moreover, although the difference compared with the threshold value Th1 is the difference between the System-Max-NOE and the minimum Registered-System-Max-NOE, the Registered-System-Max-NOE is not updated just because data was erased from one of the physical blocks.

For this reason, a frequent occurrence of the wear leveling processing is avoidable.

Next, the meaning of the threshold values Th2 and S304 is described.

If the difference between the System-Max-NOE and the Spare-Max-NOE is small, a data copy processing (S305) is performed. If the difference between the System-Max-NOE and the Spare-Max-NOE is small, the Spare-Max-NOE is big enough. And as the threshold value Th1 was described, the logical block corresponded to the minimum Registered-System-Max-NOE is a logical block which updating is not made forever, and it is considered with the present embodiment that the NOE of the physical block allocated to such a logical block is the minimum.

Therefore, coping data to the spare block of the Spare-Max-NOE from the physical block whose NOE is the minimum, matches the reason of leveling of the NOE.

Figure 5:
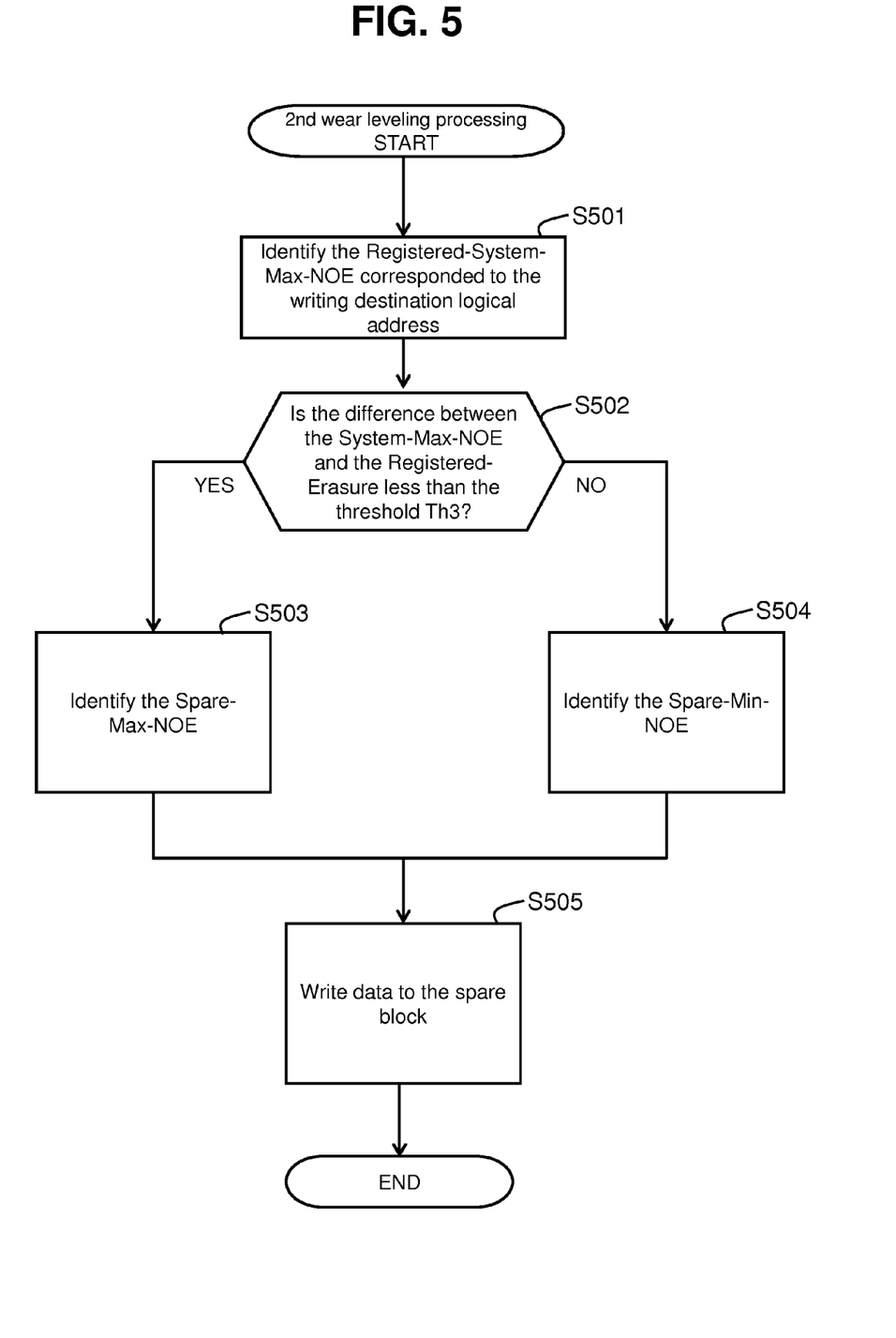
FIG. 5 is a flow chart of the 2nd wear leveling processing according to the embodiment of the present invention.

FIG. 5 is a flow chart of the 2nd wear leveling processing according to the present embodiment.

The 2nd wear leveling processing is an example of a dynamic wear leveling processing, for example, and, specifically, is a new allocation write processing, for example. The new allocation write processing is a write processing in the case where there is no free physical page in the physical block allocated to the logical block (write destination logical block) to which LBA specified by the write command from the host system 4 belongs, and a spare block needs to be allocated to the logical block.

The microprocessor 6 identifies the Registered-System-Max-NOE corresponded to the write destination logical block from the address conversion table 205 (S501). The microprocessor 6 judges whether the difference (the 3rd difference) between the System-Max-NOE 202 and the identified Registered-System-Max-NOE is less than the threshold value Th3 (S502).

When the judgment result of S502 is affirmative (S502: YES), the microprocessor 6 identifies the Spare-Max-NOE 203 (S503), and allocates the spare block with the Spare-Max-NOE 203 in the write destination logical block and writes data (write target data according to the write command from the host system 4) to the allocated spare block (S505). On the other hand, when the judgment result of S502 is negative (S502: NO), the microprocessor 6 identifies the Spare-Min-NOE 204 (S504), allocates the spare block with the Spare-Min-NOE 204 in the write destination logical block, and writes data to the allocated spare block (S505).

According to the 2nd wear leveling processing, if the difference between the System-Max-NOE and the Registered-System-Max-NOE corresponding to the write destination logical block is large (if it is equal to or larger than the threshold value Th3), the frequency of write for the write destination logical block is low, therefore a spare block associate with the Spare-Max-NOE is allocated. On the other hand, if the difference between the System-Max-NOE and the Registered-System-Max-NOE corresponding to the write destination logical block is small (if it is less than the threshold value Th3), the frequency of write for the write destination logical block is high, therefore a spare block with the Spare-Min-NOE is allocated. Therefore, the NOEs can be equalized is realized.

According to the present embodiment, it is possible to equalize the NOEs of physical blocks allocated to logical blocks whose write frequencies are low. Moreover, the erasures can be equalized also about logical block groups, each where although the frequency which serves as a write destination in the past period is high, the frequency which serves as a write destination in the latest period is low. Furthermore, since at least one of the threshold values Th1 and Th2 can be set according to the capacity or durability of the flash memory 2, the frequency of the 1st wear leveling processing can be controlled based on the durability of the flash memory 2, etc.

Although the above has described an embodiment of the present invention, this embodiment is merely an example for illustrating the present invention and therefore does not limit the scope of the present invention thereto. The present invention can be implemented in various other embodiments. For example, the FM system 1 mentioned above is applicable to a memory system which includes a memory (volatile memory or nonvolatile memory) other than a flash memory. Moreover, although a processor in the memory controller may be typically a microprocessor, it may include a hardware circuitry which performs a part of the processing. Moreover, the Registered-System-Max-NOE does not need to be registered in the address conversion table, and should just be associated with the logical address by the table other than the address conversion table, etc.

The invention claimed is:

1. A memory controller which allocates, to a logical area, a free physical area of multiple physical areas in a memory where data is erased per physical area, and writes data according to a write command from a host system to the allocated free physical area, the memory controller comprising:
    a storage unit in which reference numbers respectively associated with multiple logical areas are registered; and
    a processor being configured to identify a first maximum erasure count from among all erasure counts, which are respectively the numbers of times of erasure already performed respectively in the multiple physical areas when a free physical area is allocated to a first logical area, and to register the identified first maximum erasure count to the storage unit as the reference number associated with the first logical area.

2. The memory controller according to claim 1, wherein the processor is configured to
    identify a second maximum erasure count from among all the erasure counts and a minimum one of the reference numbers associated with the multiple logical areas, respectively,
    compare a first difference between the second identified maximum erasure count and the identified minimum one with a first threshold, and
    perform data copy processing when the first difference is not less than the first threshold,
    wherein,
    in a first processing of the data copy processing, data are copied, from a physical area allocated to a second logical area associated with the identified minimum one, to a first free physical area in which an erasure count is a maximum among free physical areas,
    in a second processing of the data copy processing, the first free physical area is newly allocated to the second logical area,
    in a third processing of the data copy processing, the identified second maximum erasure count is newly registered to the storage unit as the reference number associated with the second logical area.

3. The memory controller according to claim 2, wherein the processor is configured to
    compare a second difference between the identified second maximum erasure count and an erasure count of the first free physical area with a second threshold, and
    perform the data copy processing when the first difference is not less than the first threshold and the second difference is less than the second threshold.

4. The memory controller according to claim 3, wherein the second threshold is different from the first threshold.

5. The memory controller according to claim 1, wherein the processor is configured to
    identify a third maximum erasure count from among all the erasure counts and a reference number associated with a third logical area designated by the write command from a host system, compare a third difference between the identified third erasure count and the identified reference number with a third threshold, and allocate a second free physical area, in which an erasure count is a maximum among free physical areas, to the third logical area when the third difference is not less than the third threshold, and allocate a third free physical area, in which an erasure count is a minimum among free physical areas, to the third logical area when the third difference is less than the third threshold.

6. A memory system comprising:

a memory controller according to claim 1; and a memory being coupled to the memory controller.

7. A memory control method which is a method for controlling memory, the memory including multiple physical areas, and the memory where data is erased per physical area, the memory control method comprising:

allocating a free physical area of the multiple physical areas to a logical area of multiple logical areas, which corresponds to a logical address space of a host system;

identifying a maximum erasure count from among all erasure counts which are respectively the numbers of times of erasure already performed respectively in the multiple physical areas; and associating the identified maximum erasure count with the logical area, to which the free physical area is allocated, as a reference number for judging a frequency of erasure.

* * * * *